Sept. 27, 1955  R. S. MASON ET AL  2,718,689
ROUTING
Filed Sept. 28, 1950  3 Sheets-Sheet 2
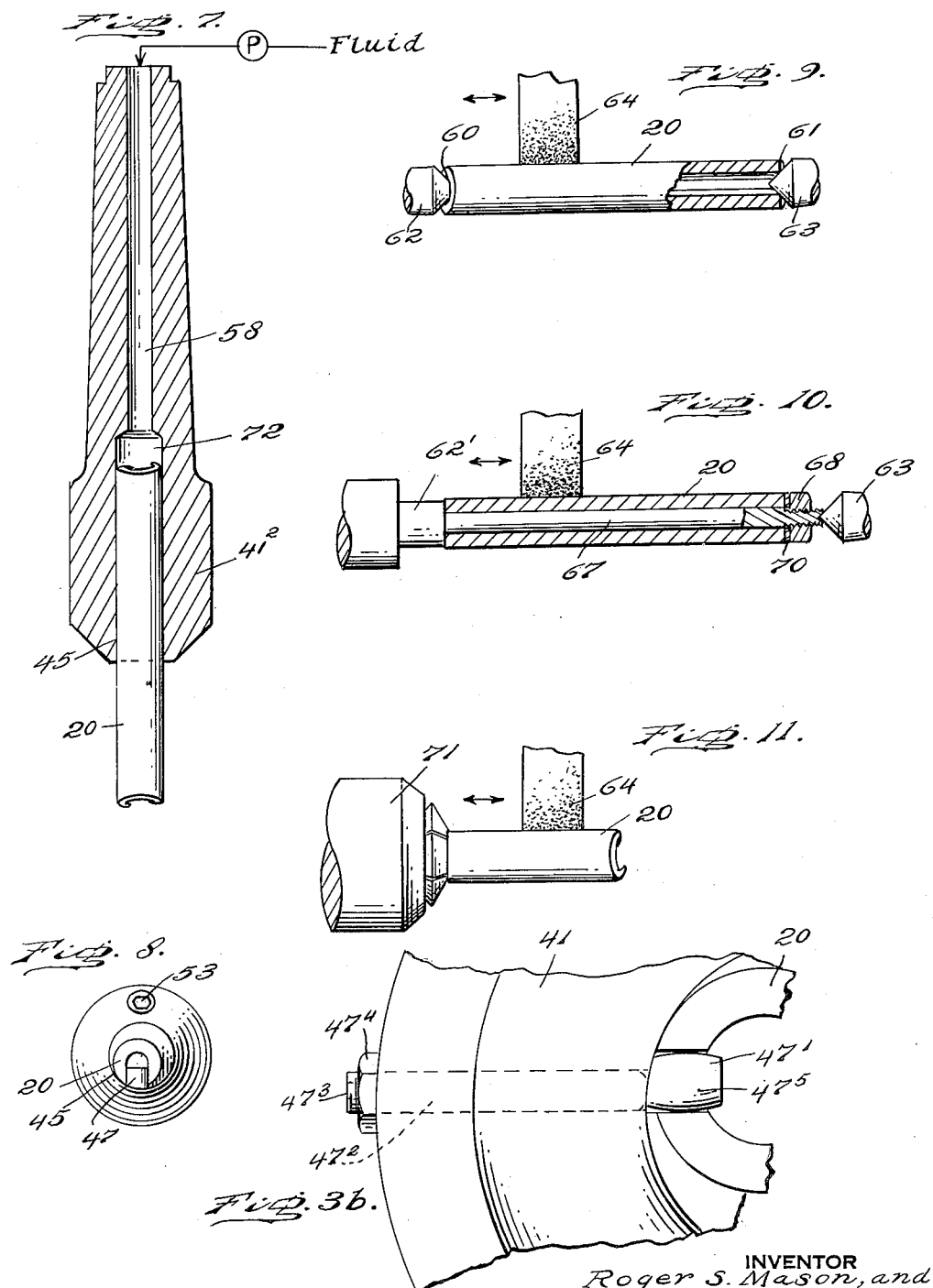
INVENTOR
Roger S. Mason, and
Richard H. Mason.
BY
ATTORNEYS.

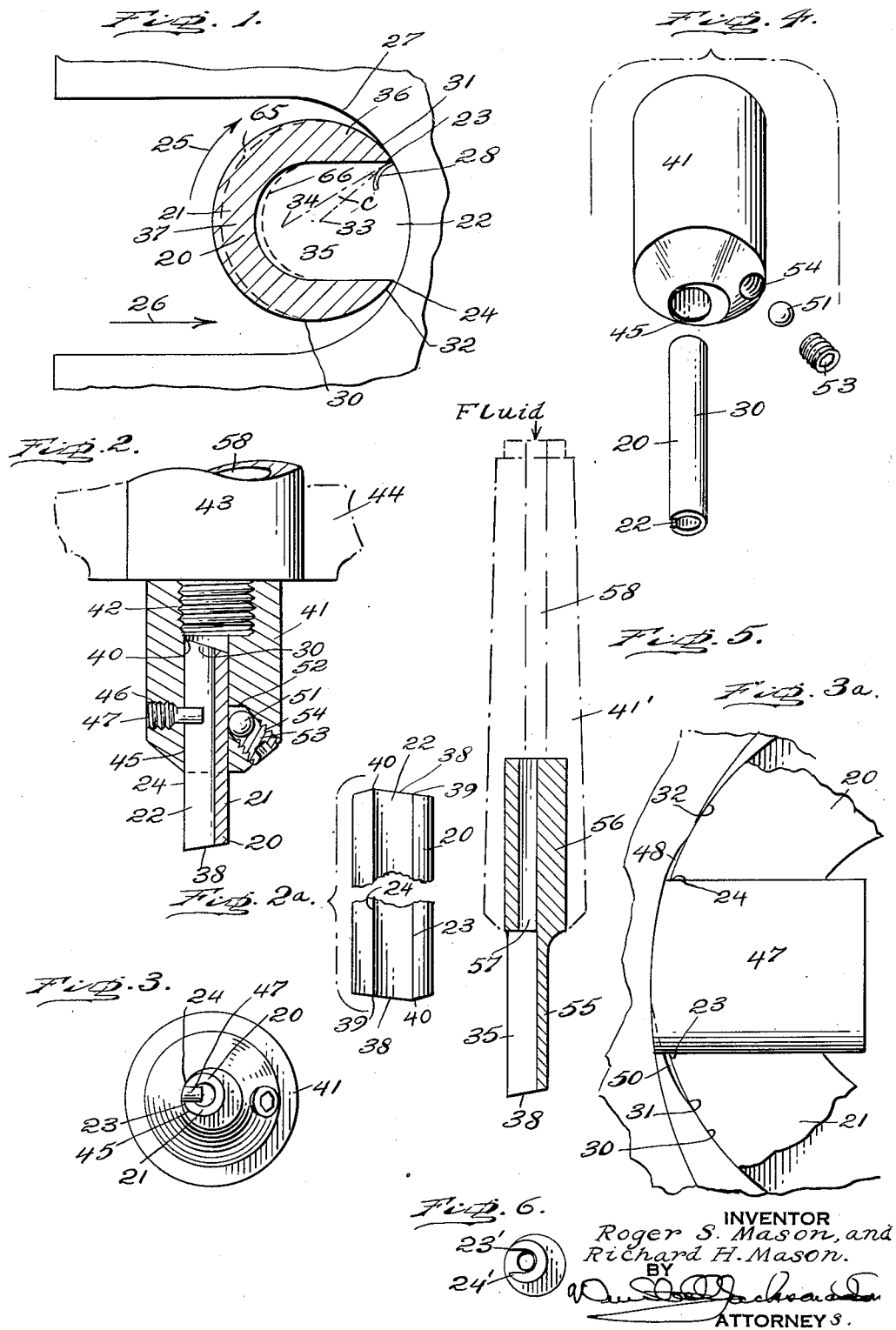

Sept. 27, 1955  R. S. MASON ET AL  2,718,689
ROUTING
Filed Sept. 28, 1950  3 Sheets-Sheet 3
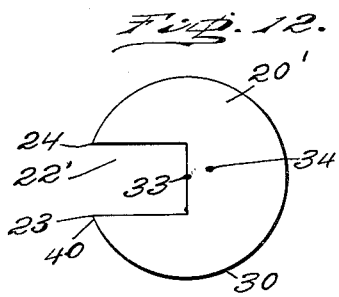
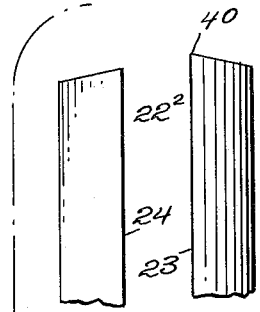
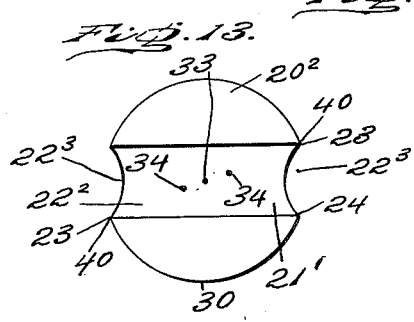
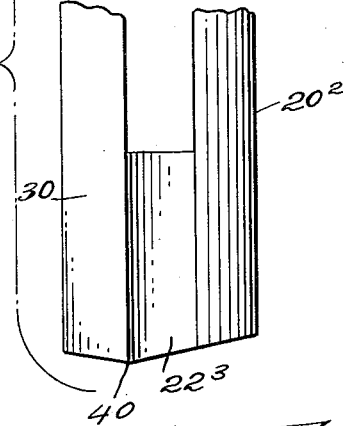
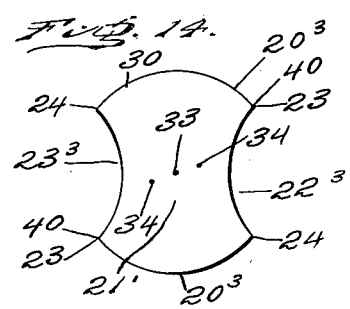
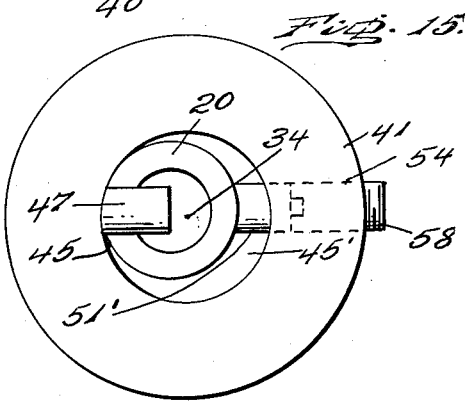
INVENTOR
Roger S. Mason and
Richard H. Mason.
BY
ATTORNEYS.

United States Patent Office 2,718,689
Patented Sept. 27, 1955

2,718,689

ROUTING

Roger S. Mason, Philadelphia, Pa., and Richard H. Mason, Havre de Grace, Md.

Application September 28, 1950, Serial No. 187,178

3 Claims. (Cl. 29—103)

The present invention relates to rotary cutting such as routing and planing and particularly to the construction of routing bits or end milling cutters and planers and chucks therefor and the methods of sharpening and regrinding the same.

When reference is made herein to rotary cutters or routing bits it is intended to include end milling cutters, planers and similar cutting tools.

A purpose of the invention is to make a routing bit cut of a member of uniform exteriorly circular cross section such as a tube with an open side or slot having one or preferably two cutting edges along the open side, to grind the bit while turning on the axis of the exterior circular cross section and to mount the bit for cutting eccentric to the axis with the cutting edge outwardly disposed parallel to the axis of cutting.

A further purpose is to increase the torsional strength of routing bits by placing the material far from the neutral axis in a tubular or other uniform cross sectional wall.

A further purpose is to provide a routing bit of uniform cross section, slotted straight from end to end, with a concentric or circular outer contour having one or preferably two or more concentric sharpened cutting edges, straight and parallel to the axis of the outer contour, desirably equidistant from the axis of the outer contour, which is within the confines of the cross section.

A further purpose is to turn the routing bit about an axis parallel to and eccentric to the axis of the outer contour, within its confines, nearer to one cutting edge, and farther from the other cutting edge which is directed forwardly in the direction of rotation at the circumference of the path of cut.

A further purpose is to obtain improved static balance in a routing bit by making the routing bit comparatively thin far from the axis of turning and comparatively thick close to the axis of turning.

A further purpose is to make the routing bit operate at a similar setting in a holder repeatedly after regrinding, establishing the setting by contact of the cutting edge with an eccentric gripping surface of the holder.

A further purpose is to automatically align the cutting edge of a routing bit with a chuck when the routing bit is reground.

A further purpose is to provide a regrinding center on the routing bit itself.

A further purpose is to make a routing bit reversible so that both ends can be sharpened and opposite cutting edges can be employed and so that a single sharpening operation sharpens forward cutting edges of two routing bits.

A further purpose is to adjust the length of a routing bit exposed beyond the chuck to improve the support of the end cutting edge, to reduce the error due to back lash and lack of concentricity in moving parts and to permit accurate gaging of depth of cut.

A further purpose is to mount a routing bit eccentrically in a chuck opening and to direct the cutting edge outwardly, desirably extending a key into the open side or slot and clamping from the opposite side.

A further purpose is to relieve the portion of the chuck opening which engages the cutting edges.

A further purpose is to carry coolant or cutting fluid through a chuck and through a longitudinal opening or slot in a routing bit.

A further purpose is to grind a routing bit while turning concentrically with respect to the cross section portion of the routing bit, either on end centers, on a mounting rod or in a grinding chuck.

Further purposes appear in the specification and in the claims.

Routing bits at the present time normally employ L-shaped recesses extending in from the circumference after the manner of a flute in a straight drill. This causes great difficulty in regrinding because the setting of the routing bit for regrinding does not conform with any center which exists on the tool and it is a matter of skill of the tool room operator each time he regrinds the bit to set each flute at the proper position to grind its cutting edge.

The present invention is particularly concerned with more accurate, rapid and convenient regrinding by turning the bit about an axis concentric to the outer circumferential portion of the bit itself, but eccentric to the axis on which the bit turns during routing. To accomplish this result, the routing bit is desirably made hollow or slotted and exteriorly concentric for at least a portion of its length, and the exterior of the cross section of the bit is concentric with the axis of grinding or regrinding. One side of the wall is open or slotted and a cutting edge or cutting edges extend along this side. The cutting edges are concentric with the exterior contour of the bit. The wall of the bit in one form thus has a U-shaped cross section, the ends of the arms of the U being respectively cutting and trailing edges for any given direction of rotation. The bit can be made reversible, in which case an edge which is a cutting edge for one direction of rotation is a trailing edge for the same direction of rotation when the bit is reversed. For side cutting purposes the bit will be differently chucked for opposite directions of rotation.

The bit may take various forms, which are alike in that the cross section which has the cutting edge or edges is uniform and slotted straight longitudinally. The outer contour is circular and concentric to a regrinding axis within the confines of the cross section and parallel with the cutting edge or edges. The axis of the circular outer contour is equidistant from both cutting edges in the bit if there are two. The bit will turn in cutting about an axis within the confines of the cross section, eccentric to the axis of the circular contour and parallel to the cutting edge and to the cross section of the circular contour. The axis of cutting is nearer to the trailing cutting edge and farther from the forwardly directed (active) cutting edge.

By this construction the center or slot of the bit is open for distribution of coolant or cutting fluid. The structure is concentrated far from the neutral axis, thus greatly increasing the strength, particularly against torsional loads. The static balance of the bit is improved since the portions far from the axis of turning during routing are of lighter section and those nearer to the axis of turning are of heavier section.

The chuck which mounts the bit is desirably provided with an eccentric chuck gripping surface having a key which extends into the U or slot of the cross section and a clamp which urges the bit laterally toward the open side of the U. Thus in each regrinding, the cutting edge automatically aligns in the chuck. This is accomplished by a key inside the U of the bit and the engagement of the cutting edge with the inside of the holder or chuck.

To avoid damage to the cutting edge or edges, the chuck is relieved at points corresponding to such edge or edges. The length of the routing bit protruding from the chuck is readily adjusted to increase the strength of the routing bit, especially for end cutting, to reduce the error due to back lash or lack of concentricity of moving parts, and to permit accurate gaging of the depth.

For the purpose of regrinding the bit can be conveniently mounted to turn on the center of the exterior contour of the cross section in a chuck, a live and dead center or a mounting rod on centers.

The end or preferably the ends of the bit are ground diagonally with the cutting edge extending farthest from the opposite end of the bit.

In the drawings I have chosen to illustrate a few only of the numerous embodiments in which my invention may appear, selecting the forms shown from the standpoints of convenience in illustration, satisfactory operation and clear demonstration of the principles involved.

The preferred embodiment of the invention is shown in Figures 1 to 4 inclusive.

Figure 1 is a horizontal section through a routing bit in accordance with the invention, showing the routing bit in process of cutting at the side.

Figure 2 is an axial section of a routing tool in accordance with the invention.

Figure 2a is an enlarged fragmentary side elevation of the two ends of the bit of Figure 2, looking into the hollow interior.

Figure 3 is a cutting end elevation of Figure 2.

Figure 3a is an enlarged fragment of Figure 3.

Figure 3b is a view corresponding to Figure 3a showing a variation.

Figure 4 is an exploded perspective of the chuck and bit shown in Figures 2 and 3, omitting the key.

Figure 5 is a section of a variant form of routing bit, the section being taken on the axis of a chuck mounting the routing bit and shown in dot-and-dash lines.

Figure 6 is an end elevation of the routing bit of Figure 5.

Figure 7 is an axial section through a chuck mounting the routing bit in accordance with a variant form of the invention.

Figure 8 is an end elevation of the chuck and routing bit of Figure 7.

Figures 9, 10 and 11 are fragmentary diagrammatic views, in some cases partially in axial section, showing the methods of grinding the routing bit on the lateral circumference.

Figures 12, 13 and 14 are bottom end elevations of variations in the cross section of the bit of the invention.

Figure 13a is a side elevation of the bit of Figure 13.

Figure 15 is a bottom end elevation of a chuck which is a modification of Figure 2.

Describing in illustration but not in limitation and referring to the drawings.

The routing bit 20, according to the invention in the preferred embodiment of Figures 1 to 4, has a tubular wall 21 having a slotted or open side 22 and provided with edges 23 and 24 extending longitudinally, parallel to the axis of the tube on either edge of the open side. One of these edges is a cutting edge and the other a trailing edge for any direction of rotation and any position of the reversible cutting ends, the edge 23 being the cutting edge when the tool is turning in the direction of arrow 25 (Figure 1) with the particular end shown in the work and moving laterally in the direction of arrow 26 into a cut 27 to remove a chip 28.

The external circumference 30 of the tubular wall is circular as best seen in Figure 1, and the exterior surfaces 31 and 32 of the cutting and trailing edges (or two cutting edges as later explained) conform to the circle. The axis of the tube may go through point 33 in the hollow interior, and in any case is within the confines of the outer contour.

The bit, on the other hand, during routing, does not turn about the axis 33 of the outer contour, but turns about an axis eccentric to the outer contour, parallel to the cutting edge and to the axis of the exterior contour, and moved away from the cutting edge with respect to the axis 33 of the exterior contour as indicated by point 34 (Figure 1) for the axis of cutting rotation. Thus the cutting and trailing edges 23 and 24 are projected farther from the cutting axis 34 than any other portion of the bit. The cutting edge is farther from axis 34 than any other point on the outer contour.

While the bit 20 as just described is tubular, it will be understood that bits of other cross sections can be used provided the outer contour is concentric and has a slot running straight and longitudinally along one side, provided with a cutting edge or edges. In Figure 12 the bit 20' is like that of Figures 1, 2, 2a, 3 and 4 except that the slot 22' which extends longitudinally parallel to the axes 33 and 34 is square rather than rounded at the interior.

In some cases there may be four potential cutting edges instead of two on each reversible bit. Figures 13 and 13a show a bit of circular outer contour 30 having a slot $22^2$ clear across the middle and extending straight longitudinally nearly to the far end. At the far end there are opposite grooves $22^3$ extending straight and longitudinally the rest of the distance to the far end. In Figure 14 the grooves $23^3$ extend straight and longitudinally from one end to the other on opposite sides (or circumferentially spaced sides if more than two grooves are used), leaving a web 21' across the center. Figures 13 and 14 show a regrinding center 33 and two eccentric centers of rotation 34 (for different cutting edges for each end-to-end bit position).

The bits of Figures 12, 13 and 14 are reversible and desirably have end cutting edges as in the bit of Figures 1 to 4.

The bit has a groove, slot or U-shaped interior passage 35 with an open side, and this passage may be used, as later explained, to distribute coolant or cutting fluid to the cutting edge. In cross section, the wall of the tube thins down at 36 toward the cutting edge as compared to thicker portion 37 remote from the cutting edge (on the opposite side of the cutting axis), but the thin portion 36 is comparatively farther from the axis of routing rotation 34 than the thick portion 37, so that the two portions tend to maintain static balance in the routing bit. This is important, as the speed of rotation in routing is often of the order of 10,000 or 12,000 R. P. M.

The routing bit is frequently used for end milling, slotting or the like, and the end is sharpened diagonally at 38 with the "higher point" or point extending farthest from the opposite end at the cutting edge as shown by the comparison between the position of the trailing edge at the end at 39 and the position of the cutting edge at the end at 40 in Figure 2a. It is desirable to sharpen both the cutting and trailing edges alike so that the bit can be reversible and for this purpose the opposite end should have the point 40, which extends farthest from the remote end of the bit, at its cutting edge 24 (which corresponds to the trailing edge when the bit is mounted with the lower end active as shown in Figure 2a), but constitutes the cutting edge when the bit is taken out of the chuck and reversed end to end and then put back in the chuck, using the same direction of rotation. While the ends as shown are sharpened in a diagonal plane, it will be understood that the diagonal may not lie in a plane, but may be helical.

The chuck, as shown in Figures 1 to 4, may desirably comprise a chuck body 41 having a threaded socket 42 which is suitably threaded on a spindle 43 which rotates in a suitable bearing 44. A chuck opening extends longitudinally of the chuck and provides an eccentric gripping surface 45, to receive the circular exterior contour 30 of the routing bit.

The chuck opening may be circular and eccentric to the axis of chuck rotation as shown in Figures 2, 3 and 4, or, as shown in Figure 15, the opening 45' may be concentric and may have a jaw 51' socketing in the end of jaw nut 58 to force the cutting edges of the bit against the eccentric gripping surface 45 on the inside of the opening 45' of the chuck. The eccentricity in Figure 15 is exaggerated for purposes of illustration.

Any suitable clamp or jam device may be provided to lock the routing bit in place in the chuck. We illustrate a jam ball 51 at a radially opposite position from the key, held in a ball recess 52 which will desirably be shaped on the inside so as to prevent the escape of the ball, and subjected to pressure by a jam screw 53 (suitably of Allen-head type) in a threaded jam screw opening 54 desirably extending diagonally inwardly toward the chuck opening or recess.

While it is preferred, for most cases, to employ an eccentric chuck opening, the same result can be obtained by mounting the cutting portion of the routing bit eccentrically on a concentric shank. This is illustrated, for example, in the form of Figures 5 and 6 where the bit comprises a cutting portion 55 which is desirably of the same cross section and other characteristics as the bit of Figures 1 to 4 inclusive, integrally united as by forming from the same piece or welding to a shank 56. The cutting portion 55 is disposed eccentrically to the shank with the cutting edge outwardly directed at the position farthest away from the axis of the shank, and extending further out than the trailing edge, while the shank is arranged to mount concentrically in any suitable chuck 41'.

It will be noted that the cutting edge 23' is set slightly farther radially outwardly than the trailing edge 24' so that the trailing edge will clear from the work while the cutting edge will engage the work. The same feature as already explained is present in Figures 1 to 4.

The magnitude of the angle C will vary depending upon the cut per revolution which is desired, but good practice indicates that the angle should be between 2 and 6° for cutting metals, plastics and wood, although the angle may be increased providing chattering is not produced at the speed of cut. It will be evident that the location of the center 33 of the tube for a particular position of the axis 34 of rotation and of the forward cutting edge 23 determines the angle of setting of the center of the key.

To prevent angular turning of the bit in the chuck, a threaded opening 46 is provided in the chuck body extending radially inwardly at approximately the point of maximum radial distance of the chuck recess from the chuck axis. A key 47 is threaded into the opening 46 and engages inside the U-shaped cross section, the key being desirably wide enough to fill the space between the arms of the U.

In order to prevent damage by the wall of the chuck opening to the cutting edge, the wall of the chuck opening is desirably slightly relieved opposite both cutting edges at 48 and 50 as shown in Figure 3a. This relief is in effect accomplished by longitudinally slotting the chuck recess or opening at positions corresponding to the sides of the key. The slots will desirably be of very slight depth so as to relieve the pressure on the cutting edge or edges. A relief of approximately 0.0005 to 0.002 inch is entirely adequate to avoid damage to the cutting edge in the normal case.

To obtain the best clearance angle for cutting different materials, the clearance angle should be adjustable. If the adjustment is sufficient, this can provide for change in the direction of rotation. To adjust the key, it may be convenient to provide the key 47' as shown in Figure 3b with a cylindrical shank $47^2$ passing through to the outside of the chuck, provided with an Allen head $47^3$ at the outer end, and carrying a locking nut $47^4$. A key head $47^5$ extending inside the bit is eccentric to the axis of the shank. The head $47^5$ is slightly rounded at the inner end and bulged in the middle to adapt itself to the bit with adjustment.

The routing bit is mounted in the chuck with the cutting edge disposed outwardly at the maximum distance from the axis of the chuck so that as the chuck turns on its own axis the cutting edge will engage the work while the back wall of the bit will clear the work. At the same time the bit is disposed slightly angularly so that the trailing edge does not extend as far out as the cutting edge. This disposes the U-shaped cross section outwardly with respect to the chuck axis.

The manner of locating the angular relation of the keyway and the amount of clearance of the trailing edge of the bit can be best understood by reference to Figure 1. A dot-and-dash line is there drawn from the cutting axis 34 of the bit to the forward cutting edge 23 at the intersection with the circular cut 27. This line is of course a radius and is perpendicular to the tangent to the circle of the cut at the point of cut. An angle of clearance C is then swung about the intersection of the cutting edge 23 with the circle of cut, the angle deviating from the radius of the circle of cut in a direction counter-clockwise of the radius of the circle of cut as shown in Figure 1. One side of the angle C includes the axis 34 of turning and the other side of the angle C includes the axis 33 of the tube. It is then merely necessary to lay off the radius of the tube from the forward cutting edge 23 on the side of the angle which includes the axis of the tube to locate the axis of the tube.

The shank desirably has a longitudinal bore or opening 57 which communicates with the hollow interior of the cut portion 55 at the bottom and communicates with a hollow bore 58 of the chuck 41'. In this way coolant such as oil, water, air, gas or other fluid can be circulated through the passages 58, 57, and through the hollow interior 35 of the cutting tool. Similarly cutting fluid such as lard oil can be circulated. When the forms of Figures 12, 13 and 14 are used, the coolant or cutting fluid circulates through the slot or grooves.

The provision for circulating coolant or cutting fluid through the hollow interior of the cutting tool can be employed with a chuck which has an off-center chuck opening 45 for a reversible mounted bit. This is shown in Figures 7 and 8 where a chuck $41^2$ has a coolant passage 58 which communicates with the upper end of the routing bit. The chuck of Figures 7 and 8 may otherwise be that of Figures 1 to 4 inclusive.

The fluid is circulated as by a pump P.

In order to grind the routing bit of the invention, it is merely necessary to turn it on the center of its own tube, which is different from the center of the chuck. This can be accomplished in various ways as shown in Figures 9 to 11. In Figure 9 a routing bit 20 is centered on conical center openings 60 and 61 which are formed at the ends of the hollow interior 35, but are desirably of slightly larger diameter than that of the hollow interior. These center openings 60 and 61 have as their axis the axis 33 of the tube. The routing bit is held between a live center 62 and a dead center 63 inserted in the center openings to turn the routing bit around the axis of its own tube, in accordance with well-known means. A grinding wheel 64 then moves longitudinally as shown by the arrow to grind the surface and thus sharpen the cutting edge. In the end, after resharpening, the routing bit will be slightly smaller, but when set in the chuck of Figures 1 to 4 the cutting edge will be positioned at the same position and held in the same way by the key, but the rear wall will be closer to the cutting edge as indicated by the dotted lines 65 and 66 of Figure 1. The jam device will then be screwed in slightly farther to hold the routing bit in position.

By reference to Figure 1 it will be seen that each time the bit or cutter is sharpened by grinding its outside circumference, it will move in farther along the key, but that it will always reach the same position for the forward cutting edge since this is determined by the intersection of the cutting edge with the side of the chuck. As the outer circumference of the tool is ground, however, the clearance of the trailing edge will increase slightly with successive grindings.

In some cases instead of using centers engaging center openings in the routing bit, the routing bit may be centered on a clamping rod which turns on the axis of the routing bit. This is shown in Figure 10, where a live center 62' carries a clamping rod 67, which extends through the hollow interior of the routing bit and is held at the very end against the routing bit by a nut 68 threaded on the end of the rod. Because of the slope of the ends of the routing bit, an irregular washer 70 may be interposed at either end to hold the routing bit more firmly. The far end of the clamping rod 67 may desirably be centered by dead center 63. When the routing bit is turned about the axis of its tube, as in Figure 10, the grinding of its surface can be accomplished by moving the grinding wheel back and forth and feeding it toward the work as in usual practice, as the work is rotated. While Figure 10 shows arbor mounting for regrinding, it will be understood that arbor mounting on an axis eccentric to the circular cross section can be used for cutting, as in a planer, and in larger and longer rotary cutters.

In some cases it is preferred to support the routing bit in a chuck during grinding and this can be accomplished using a chuck 71 as shown in Figure 11. The chuck will be of the usual type in which the chuck opening is concentric with the chuck. In this case it is necessary to re-chuck in order to complete the grinding of both ends, the usual procedure being to grind one-half of the length of the routing bit, then reverse and rechuck the routing bit and grind the other half. Using a routing bit having a shank of the character shown in Figures 5 and 6, the procedure of Figures 9 to 10 may be used, but not the procedure of Figure 11 unless the eccentric chuck of Figures 1 to 4 is employed rather than a concentric chuck. It will be noted that the opening 57 through the shank is concentric to the cutting tube portion, but is eccentric with respect to the shank, so that the opening 57 can be used for centering in grinding as in Figures 9 and 10.

It will be understood, of course, that any suitable cutting alloy may be used, such as tool steel, high speed steel, or cemented carbide, either to make up the entire routing bit or in the form of inserts at the cutting portions as well known.

In operation, the routing bit of the invention can be made by machining a uniform tube on an axis eccentric to the tube exterior to machine through a portion of the wall to make the cutting edge or edges and create a new tube with an open side wall and hollow center whose exterior is of circular cross section on the outside, thicker at the side remote from the open side wall and provided with a cutting edge concentric with the exterior of the tubular wall and desirably also with the bore. The bit can also be machined as by slotting a bar.

The ends can be formed in any usual grinding or sharpening procedure by disposing the tool diagonally with respect to the grinding wheel so that the cutting edge at each end is the highest point or the point most remote from the opposite end.

If a concentric shank is desired for mounting in a concentric chuck this can be added by welding or brazing or can be formed integrally by grinding the two ends of the routing bit about two different centers.

The routing bit can be used in any suitable routing, end milling, slotting or similar operation, using a chuck having an eccentric opening where the routing bit is entirely concentric to its tube, or using a concentric chuck of usual type where the routing bit has a shank concentric to the chuck. In any case, the cutting edge is farthest out on the circumference of the cutting circle and the trailing edge is positioned slightly inwardly, this condition being established automatically by inserting a key in the open side in the form of Figures 1 to 4, 7 and 8. The chuck on the interior is preferably relieved slightly so as not to mar the cutting edge when the routing bit is tightened by the jam device.

During use coolant or cutting fluid can be circulated through the hollow interior of the routing bit and of its shank, and through the chuck.

Where the machining operation makes it desirable to eliminate all back lash and play for minimizing torsion on the routing bit, or where exact end position of the routing bit is important, as in end milling, the routing bit can be adjusted in and out of the chuck as shown in Figure 7, where the space 72 in the chuck opening beyond the routing bit is variable to suit the setting of the routing bit endwise of the chuck.

When the routing bit requires regrinding it is taken out of its chuck and reground in accordance with any of the methods of Figures 9 to 11. The end or ends are reground, using any suitable end grinding procedure, grinding the routing bit so that the cutting edge is the high point.

We find that routing bits in accordance with the invention can be operated at very high speeds with good balance and without serious failures.

Each time the routing bit is reground it will automatically align in the chuck to position the cutting edge at the correct position in the preferred embodiment of Figures 1 to 4, or 7 and 8.

While we have shown only bits of the straight shank type it will be understood that the invention is not restricted to any particular character of shank, whether straight or tapered or stepped, and accordingly the invention can be applied with success to any desired standard or special contour of shank.

It will be evident that the chuck may be made up of several components, one of which may be called a chuck and another of which may be called an adapter.

In view of our invention and disclosure variations and modifications to meet individual whim or particular need will doubtless become evident to others skilled in the art, to obtain all or part of the benefits of our invention without copying the process and structure shown, and we, therefore, claim all such insofar as they fall within the reasonable spirit and scope of our claims.

Having thus described our invention what we claim as new and desire to secure by Letters Patent is:

1. A rotary cutting device, including a chuck and a cutting tool in said chuck, said chuck having a longitudinal round bore opening through the end thereof and positioned eccentrically to the axis of the chuck, said cutting tool being of cylindrical exterior contour and rotatably fitting said bore at one end and extending exteriorly of said chuck at the other end, at least the extending end of said tool having a radial slot extending inwardly from the cylindrical exterior surface thereof, past the longitudinal axis of the tool to provide a U-shaped cross section; the joinder of the edges of the slot and the exterior cylindrical surface providing a cutting edge at each side of said slot, and means on said chuck to stop the rotation of said tool in said chuck at such position that one of said cutting edges is positioned farther from the axis of the chuck than the other to provide for a cutting operation upon rotation of the chuck, whereby said edge can be repeatedly sharpened and rotated to engagement with said stop without affecting its cutting position relative to the chuck axis.

2. A rotary cutting device according to claim 1, in which the wall of said chuck bore is relieved opposite the cutting edges of said tool, and the slot in said tool extends fully from end to end of said tool.

3. A rotary cutting device according to claim 1, in which the wall of said chuck bore is relieved opposite the cutting edges of said tool, the slot in said tool extends fully from end to end of said tool, and the ends of said tool are sharpened to achieve end cutting.

(References on following page)

References Cited in the file of this patent

UNITED STATES PATENTS

| | | |
|---|---|---|
| 99,716 | Shannon | Feb. 8, 1870 |
| 173,122 | Houghton | Feb. 8, 1876 |
| 1,025,839 | Shimer | May 7, 1912 |
| 1,118,744 | Crawford | Nov. 24, 1914 |
| 1,129,925 | Walser | Mar. 2, 1915 |
| 1,187,618 | Gridley | June 20, 1916 |
| 1,476,019 | Lowry | Dec. 4, 1923 |
| 1,555,853 | Higgins | Oct. 6, 1925 |
| 1,715,097 | Redinger | May 28, 1929 |
| 1,781,863 | Shoemaker | Nov. 18, 1930 |
| 1,907,880 | Royle | May 9, 1933 |
| 2,209,867 | Wohlhaupter | July 30, 1940 |
| 2,289,065 | Oliver | July 7, 1942 |
| 2,302,869 | Jewell | Nov. 24, 1942 |
| 2,314,533 | Wallace | Mar. 23, 1943 |
| 2,362,364 | Dusevoir | Nov. 7, 1944 |
| 2,529,157 | Higerd | Nov. 7, 1950 |
| 2,539,863 | Rusnov | Jan. 30, 1951 |
| 2,554,783 | Lee | May 29, 1951 |

FOREIGN PATENTS

| | | |
|---|---|---|
| 256,153 | Great Britain | Aug. 5, 1923 |
| 485,912 | Germany | Nov. 6, 1926 |
| 814,662 | Germany | Sept. 24, 1951 |